United States Patent [19]

Neko

[11] Patent Number: 4,841,211
[45] Date of Patent: Jun. 20, 1989

[54] METERING METHOD OF INJECTION MOLDING MACHINE

[75] Inventor: Noriaki Neko, Hachioji, Japan

[73] Assignee: Fanuc Ltd., Minamitsuru, Japan

[21] Appl. No.: 81,458

[22] PCT Filed: Nov. 26, 1986

[86] PCT No.: PCT/JP86/00604
§ 371 Date: Jul. 9, 1987
§ 102(e) Date: Jul. 9, 1987

[87] PCT Pub. No.: WO87/03245
PCT Pub. Date: Jun. 4, 1987

[30] Foreign Application Priority Data

Nov. 27, 1985 [JP] Japan .................................. 60-265125

[51] Int. Cl.⁴ .............................................. G05B 19/18
[52] U.S. Cl. ....................................... 318/569; 318/560; 318/434

[58] Field of Search ............... 425/135, 149, 171, 587, 425/DIG. 4; 366/79; 264/40.3, 40.7; 164/154, 155; 318/434, 560, 569; 364/476

[56] References Cited

U.S. PATENT DOCUMENTS

| 3,860,801 | 1/1975 | Hunkar | 314/476 |
| 4,094,940 | 6/1978 | Hold | 364/476 |
| 4,326,255 | 4/1982 | Fujita | 364/476 |
| 4,601,653 | 7/1986 | Inaba | 425/587 |
| 4,695,237 | 9/1987 | Inaba | 364/476 X |

Primary Examiner—Bentsu Ro
Attorney, Agent, or Firm—Staas & Halsey

[57] ABSTRACT

A metering method for an injection molding machine, which drives a screw with a servo motor in the axial direction to perform injection including the step of applying a back pressure during metering. In order to perform high-precision metering, the servo motor is driven even after the screw position has reached a metering point, so that the screw is held at the position of the metering point.

5 Claims, 1 Drawing Sheet

METERING METHOD OF INJECTION MOLDING MACHINE

BACKGROUND OF THE INVENTION

The present invention relates to a metering method of an injection molding machine and, more particularly, to a metering method for an injection molding machine which uses a servo motor to drive a screw in a direction of a screw shaft, to perform injection, and to supply a back pressure.

In a conventional injection molding machine, hydraulic pressure is used as a source to drive a screw in an axial direction. In this conventional case, during metering, a predetermined pressure is supplied by a hydraulic pressure to the screw in the axial direction, with the screw being rotated. As the resin is melted, the molten resin is stocked in the distal end portion of the screw and the screw is then moved backward. When the screw backward movement position reaches a metering point, the rotation of the screw and application of the back pressure to the screw are stopped. However, even if rotation of the screw and application of the back pressure are stopped when the metering is completed, the screw is moved backward by the molten pressure of the resin and so on, resulting in a metering error. When the metering is incorrect and the injection amount is large, a burr may occur in a molded product. When the injection amount is insufficient, the resin cannot easily flow in a thin portion. As a result, a high-quality molded product cannot be obtained.

SUMMARY OF THE INVENTION

It is an object of the present invention to provide a metering method in which the drawbacks of the above prior art technique are eliminated and which can perform high-precision metering.

In order to achieve the above object, according to the present invention, a servo motor is used for driving a screw in an axial direction, thus performing injection and supplying a back pressure. The servo motor is driven even after a screw position has reached a metering point and the rotation of a screw is stopped, thereby holding the screw position at the position of the metering point. In this manner, after the backward movement position of the screw has reached the metering point, the rotation of the screw is stopped, and the metering process is ended. The servo motor for driving the screw in the axial direction is driven and positioned so as to hold the screw at the exact position of the metering point. Therefore, any metering error is small, and high-precision metering can be performed. Thus, factors causing a burr or a sink mark in the molded product are eliminated, and a high-quality molded product is obtained.

BRIEF DESCRIPTION OF THE DRAWING

The accompanying drawing is a block diagram of a metering control system of an injection molding machine for implementing the method of the present invention.

DETAILED DESCRIPTION OF THE PREFERRED EMBODIMENTS

Figure 1:
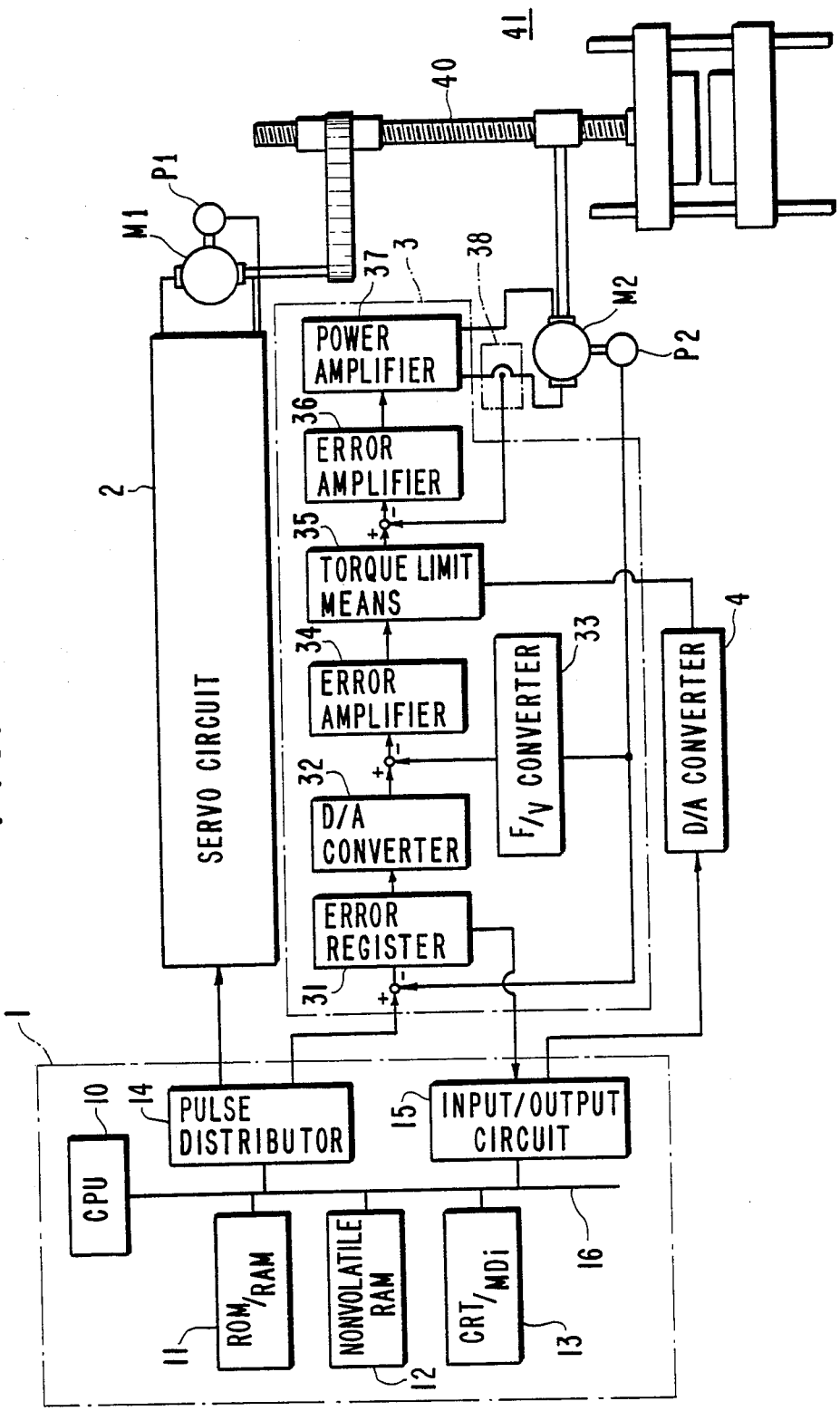

The accompanying drawing shows a metering control system of an injection molding machine according to an embodiment of the present invention. The injection molding machine 41 has a numerical controller 1, incorporating a microcomputer (CPU) 10 for controlling the injection molding machine. The controller 1 is connected to a servo circuit 2 of a servo motor M1, for rotating a screw 40, and a servo circuit 3, of an injection servo motor M2, for applying a back pressure during injection and metering. The servo motors M1 and M2 are, respectively, provided with pulse encoders P1 and P2 for detecting the position and speed thereof. Reference numeral 4 denotes a D/A converter for converting a torque limit command supplied from the numerical controller 1 into an analog voltage.

In the numerical controller 1, the microcomputer (CPU) 10 is connected to: a memory 11 including a ROM for storing a control program, for controlling the injection molding machine, and a RAM utilized for temporarily storing data; a nonvolatile RAM 12, for storing various preset values; a manual data input unit (to be referred to as a CRT/MDi hereinafter) 13 having a CRT display; a pulse distributor 14, for driving the servo motors M1 and M2; and an input/output circuit 15 through a bus 16.

The servo circuit 3 has an error register 31, a D/A converter 32, an F/V converter 33, and an error amplifier 34. The error register 31 stores a difference between a movement command, supplied from the numerical controller 1, and a movement amount of the servo motor M2, which is generated by the pulse encoder P2. The D/A converter 32 converts the value of the error register 31 into an analog signal and outputs a velocity command. The F/V converter 33 converts a frequency signal supplied from the pulse encoder P2 into a voltage. The error amplifier 34 compares the output from the D/A converter 32 with an output from the F/V converter 33, amplifies the difference therebetween, and outputs a drive current command, i.e., a torque command.

The servo circuit 3 further has a torque limit means 35, an error amplifier 36, and a power amplifier 37. The torque limit means 35 receives a voltage obtained by converting the torque limit command, supplied from the input/output circuit 15 of the numerical controller 1, into an analog signal by the D/A converter 4, clamps the output of the error amplifier 34 with a value corresponding to the torque limit command, and outputs the clamped valve. The error amplifier 36 compares the drive current command, output through the error amplifier 34 and the torque limit means 35 with a signal supplied from a current detector 38, which detects the drive current of the servo motor M2, and amplifies the difference therebetween. The power amplifier 37 responds to the output from the error amplifier 36 and drives the servo motor M2.

Although the servo circuit 2 has a similar arrangement to that of the servo circuit 3, servo circuit 2 is different from the servo circuit 3 in that no torque limit means is included.

With the above arrangement, various molding conditions are set by the CRT/MDi 13 and stored in the nonvolatile RAM 12.

The metering process associated with the present invention will now be described. The various conditions of the metering process, such as the screw position of a metering point, the screw rotation speeds and back pressures of the respective stages, and switching screw positions, where switching to the next stage is performed, are respectively set through the CRT/MDi 13.

These preset values are stored in the nonvolatile RAM 12.

When the injection molding machine 41 is actuated and the metering process is started, the CPU 10 reads out the screw rotation speed and the back pressure of the first stage, which is set and stored in the nonvolatile RAM 12. Subsequently, the CPU 10 outputs the preset screw rotation speed to the servo circuit 2 of the servo motor M1 for rotating the screw 40. The servo circuit 2 drives the servo motor M1 at a preset screw rotation speed. Meanwhile, the CPU 10 outputs a torque limit value corresponding to the readout preset back pressure to the D/A converter 4 through the input/output circuit 15. The torque limit means 35 receives the preset torque limit value, which has been converted into an analog voltage by the D/A converter 4, and clamps the output from the error amplifier 34 at the preset torque limit value.

Thereafter, the resin is melted along with the rotation of the screw 40 driven by the servo motor M1. When the molten resin pressure becomes high, the screw 40 is pushed backward. As a result, a pulse train representing the reverse rotation of the servo motor (screw backward movement) is output from the pulse encoder P2 of the servo motor M2. The error register 31 performs addition every time each pulse of the pulse train is applied. In this case, the value of the error register 31 is converted into a voltage by the D/A converter 32 and amplified and output by the error amplifier 34. This output is clamped by the torque limit means 35, and a drive current command (torque command) exceeding the torque limit value set in the torque limit means 35 is not output.

The servo motor M2 is then driven by a drive current, corresponding to the torque limit value through the error and power amplifiers 36 and 37, respectively, so that the error register 31 becomes "0", that is, so as to return to the initial position. As a result, the motor M2 generates a torque corresponding to the torque limit value, i.e., the resin is pushed by the preset back pressure. When the molten pressure of the resin exceeds the preset back pressure, the screw 40 is moved backward by the differential pressure between the resin pressure and the back pressure.

During motor control, the CPU 10 reads the value of the error register 31 at predetermined periods and adds the readout value to a present value register, which stores the present position of the screw. On the other hand, the readout value of the error register 31 is added to the error register 31 after the sign of this value is inverted, thereby following up the register. In this manner, follow-up is performed in order to set the value of the error register 31 to "0" and to hold the servo motor M2, i.e., the screw position, at the present position. However, the screw 40 continues to move backward even while the CPU 10 performs this processing, and the servo motor M2 is rotated in the reverse direction in accordance with the backward movement of the screw 40. Therefore, the value of the error register 31 never becomes "0".

A speed command for moving the screw forward is output from the D/A converter 32, added with the output from the F/V converter 33 (since the motor is rotated in the reverse direction, the output of the F/V converter 33 becomes negative, and addition is performed), and is amplified and output by the error amplifier 34. The drive current command (torque command) is clamped by the torque limit means 35 at the preset torque limit value, and the servo motor M2 is driven by a torque corresponding to the torque limit value. The CPU 10 determines whether the value of the present value register has reached the switching point from the first to second stage. When the value of the present value register reaches the switching point, the screw rotation speed and the back pressure of the second stage are read out from the nonvolatile RAM 12, and processing is performed in the same manner as described above.

In this manner, when all the stages of metering are ended and the screw position reaches the metering point, the screw rotation is stopped. The torque limit to the servo motor M2 is cancelled, and the servo motor M2 is driven to set the error register 31 to 0. As a result, since the screw 40 is not rotated and the servo motor M2 is driven so as to be positioned and held at the metering point, the screw 40 is also stopped and held at the metering point until the start of injection.

Although certain preferred embodiments have been shown and described, it should be understood that many changes and modifications may be made therein without departing from the scope of the appended claims.

I claim:

1. A method for metering resin in an injection molding machine, comprising the steps of:
   (a) controlling the injection molding machine by means of a numerical controller;
   (b) using a servo motor as a drive source for driving a screw in an axial direction;
   (c) performing injection of the resin via the screw;
   (d) during metering, applying a torque limit corresponding to the back pressure to said servo motor, to control an output of said servo motor to a torque of the back pressure;
   (e) during metering, reading via said numerical controller a value of an error register in a servo circuit which drives said servo motor, and adding the readout value to said error register after a sign of the readout value is inverted, to thereby perform follow-up so as to set the value of said error register to 0;
   (f) during metering, detecting an axial position of said screw from the value read out from said error register, thereby detecting the metering point; and
   (g) after the screw position has reached the metering point, canceling the torque limit and driving said servo motor so that the screw is positioned and held at the metering point.

2. The method according to claim 1, further comprising the steps of:
   (h) after said step (c), dividing the metering process into several stages; and
   (i) after said step (h), setting back pressures of the respective stages and start screw positions of the respective stages and storing same in memory means in said numerical controller;
   wherein said step (d) comprises the substeps of
   (i) during metering, reading via said numerical controller a back pressure stored in said memory means in accordance with the screw position; and
   (ii) outputting a torque limit corresponding to the readout back pressure to said servo motor.

3. The method according to claim 1, wherein
said step (b) further comprises using a motor for rotating the screw, said step (d) further comprises driving said motor to rotate the screw, and said step (g) further comprises stopping the drive of said motor when the metering point is reached.

4. The method according to claim 3, further comprising the steps of:
  (l) after said step (c), dividing the metering process into several stages;
  (m) after said step (l), setting screw rotation speeds of the respective stages and start screw positions of the respective stages and storing same in memory means in said numerical controller;
  wherein said step (d) comprises the substeps of
    (i) during metering, reading via said numerical controller a rotation speed stored in said memory means in accordance with the screw position; and
    (ii) rotating said screw at the readout rotation speed.

5. A method for metering resin in an injection molding machine, the metering of the resin being divided into stages, comprising the steps of:
  setting back pressures and start screw positions of the respective stages of a screw and storing same in a memory;
  detecting the motion and position of said screw caused by resin pressure;
  reading the back pressure stored in the memory which corresponds to the detected screw position;
  supplying the detected motion and position of the screw to an error register;
  outputting a torque limit corresponding to the read out back pressure to a servomotor;
  driving the servomotor to provide a preset back pressure to the screw; and
  when the screw has reached a metering point, resetting the error register to 0 and providing the servomotor with a signal from the error register for driving the servomotor to provide back pressure equal to the resin pressure for maintaining the position of the screw.

* * * * *